(12) United States Patent  
Chen

(10) Patent No.: US 7,121,394 B2
(45) Date of Patent: Oct. 17, 2006

(54) HUB ASSEMBLY FOR A BICYCLE

(75) Inventor: Hubert Chen, Taichung Hsien (TW)

(73) Assignee: Kun Teng Industry Co., Ltd., Taichung Hsien (TW)

( * ) Notice: Subject to any disclaimer, the term of this patent is extended or adjusted under 35 U.S.C. 154(b) by 110 days.

(21) Appl. No.: 11/032,004

(22) Filed: Jan. 11, 2005

(65) Prior Publication Data

US 2006/0081434 A1   Apr. 20, 2006

(30) Foreign Application Priority Data

Oct. 19, 2004   (TW) .............................. 93131658 A

(51) Int. Cl.
*F16D 41/30* (2006.01)
*B60B 27/02* (2006.01)

(52) U.S. Cl. .................. 192/64; 192/46; 301/110.5

(58) Field of Classification Search .................. 192/64
See application file for complete search history.

(56) References Cited

U.S. PATENT DOCUMENTS

| | | | |
|---|---|---|---|
| 4,254,852 A | 3/1981 | Orozco | |
| 4,400,999 A * | 8/1983 | Steuer | 475/213 |
| 5,460,254 A * | 10/1995 | Huang | 192/64 |
| 5,540,456 A | 7/1996 | Meier-Burkamp | |
| 6,155,394 A | 12/2000 | Shook | |
| 6,386,644 B1 * | 5/2002 | Chen | 301/110.5 |
| 6,516,931 B1 * | 2/2003 | Kroger | 192/46 |
| 2003/0198419 A1 | 10/2003 | Chen | |

FOREIGN PATENT DOCUMENTS

| | | |
|---|---|---|
| EP | 1 629 998 A1 | 3/2006 |
| GB | 2128273 A * | 4/1984 |

* cited by examiner

*Primary Examiner*—Richard M. Lorence
(74) *Attorney, Agent, or Firm*—Foley & Lardner LLP

(57) ABSTRACT

A hub assembly for a bicycle includes a hub shell adapted to be rotatably mounted on a hub axle, and having a plurality of angularly displaced retreat bores for receiving pawls, respectively, a flywheel mounting cylinder rotatably mounted on the hub axle and having a tubular coupling wall confronting the retreat bores, and an annular drive member including a coupling segment which is coupled to and which is rotated with the tubular coupling wall, and a toothed segment which extends into an annular accommodation space between the hub shell and the hub axle to be coupled with the pawls radially so as to form a uni-directional mechanism for driving the hub shell to rotate in a clockwise direction.

8 Claims, 3 Drawing Sheets

HUB ASSEMBLY FOR A BICYCLE

CROSS-REFERENCE TO RELATED APPLICATION

This application claims priority of Taiwanese Application No. 093131658, filed on Oct. 19, 2004.

BACKGROUND OF THE INVENTION

1. Field of the Invention

This invention relates to a hub assembly for a bicycle, more particularly to a hub assembly with a ratchet-and-pawl mechanism to drive rotation of a hub shell in a uni-direction.

2. Description of the Related Art

A conventional hub assembly for a bicycle, such as that disclosed in US 2003/0198419 A1, includes a hub shell mounted on and rotatable relative to a hub axle, a ratchet-and-pawl mechanism disposed inwardly of the hub shell, and a sprocket mounting member coupled with a side of the hub shell through the ratchet-and-pawl mechanism. The mechanism includes an annular ratchet member having an outer threaded surface threadedly engaging the hub shell, and an inner toothed surface disposed to engage pawls which are mounted on a pawl mounting seat that is coupled to rotate with the sprocket mounting member, and a coil spring disposed to bias the pawls to engage the inner toothed surface so as to transmit the drive of the sprocket mounting member to the hub shell in a uni-direction.

The drawbacks of the aforementioned conventional hub assembly are as follows:

1. The pawls and the ratchet member are required to have a sufficient rigidity for purposes of engagement and thus are made of an alloy steel material. In addition, the ratchet member is relatively thick to form the outer threaded surface and the inner toothed surface. Hence, the pawls and the ratchet member are bulky.

2. Since the pawls are biased by the coil spring to engage the inner toothed surface of the ratchet member, the assembly and replacement of the pawls are inconvenient to conduct.

SUMMARY OF THE INVENTION

The object of the present invention is to provide a hub assembly for a bicycle which is light and compact and which has a ratchet-and-pawl mechanism that can be assembled conveniently.

According to this invention, the hub assembly includes a hub shell which is adapted to be mounted on and rotatable relative to a hub axle about an axis, and which has an inner tubular wall surface that is adapted to be spaced apart from the hub axle to define an annular accommodation space therebetween, that extends along the axis, and that terminates at an inner periphery. The inner tubular wall surface has a plurality of retreat bores which are angularly displaced from one another about the axis, and which are disposed proximate to the inner periphery, and which respectively extend outwardly and radially. A spoke-mounting member includes a tubular mount which extends from the inner periphery outwardly and radially, and which has a plurality of access openings that are angularly displaced from one another around the axis and that extend along the axis to be communicated with corresponding ones of the retreat bores, respectively. A plurality of pawls are disposed respectively in the retreat bores, and are movable between a driven position, where the pawls extend radially into the annular accommodation space, and an idle position, where the pawls retreat radially into the retreat bores. A flywheel mounting cylinder is adapted to be rotatably mounted on the hub axle, and has a tubular coupling wall that confronts the tubular mount. An annular drive member includes a coupling segment which is coupled to be rotated with the tubular coupling wall, and a toothed segment which is opposite to the coupling segment along the axis and which extends into the annular accommodation space to confront the pawls radially. The toothed segment is coupled with the pawls to form a uni-directional mechanism that enables the transmission of drive when the toothed segment engages the pawls in the driven position to thereby drive the hub shell to rotate in a clockwise direction, and that disenables the transmission of drive when the toothed segment passes over the pawls by forcing the pawls to the idle position to thereby enable the hub shell to remain unmoved in a counterclockwise direction.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
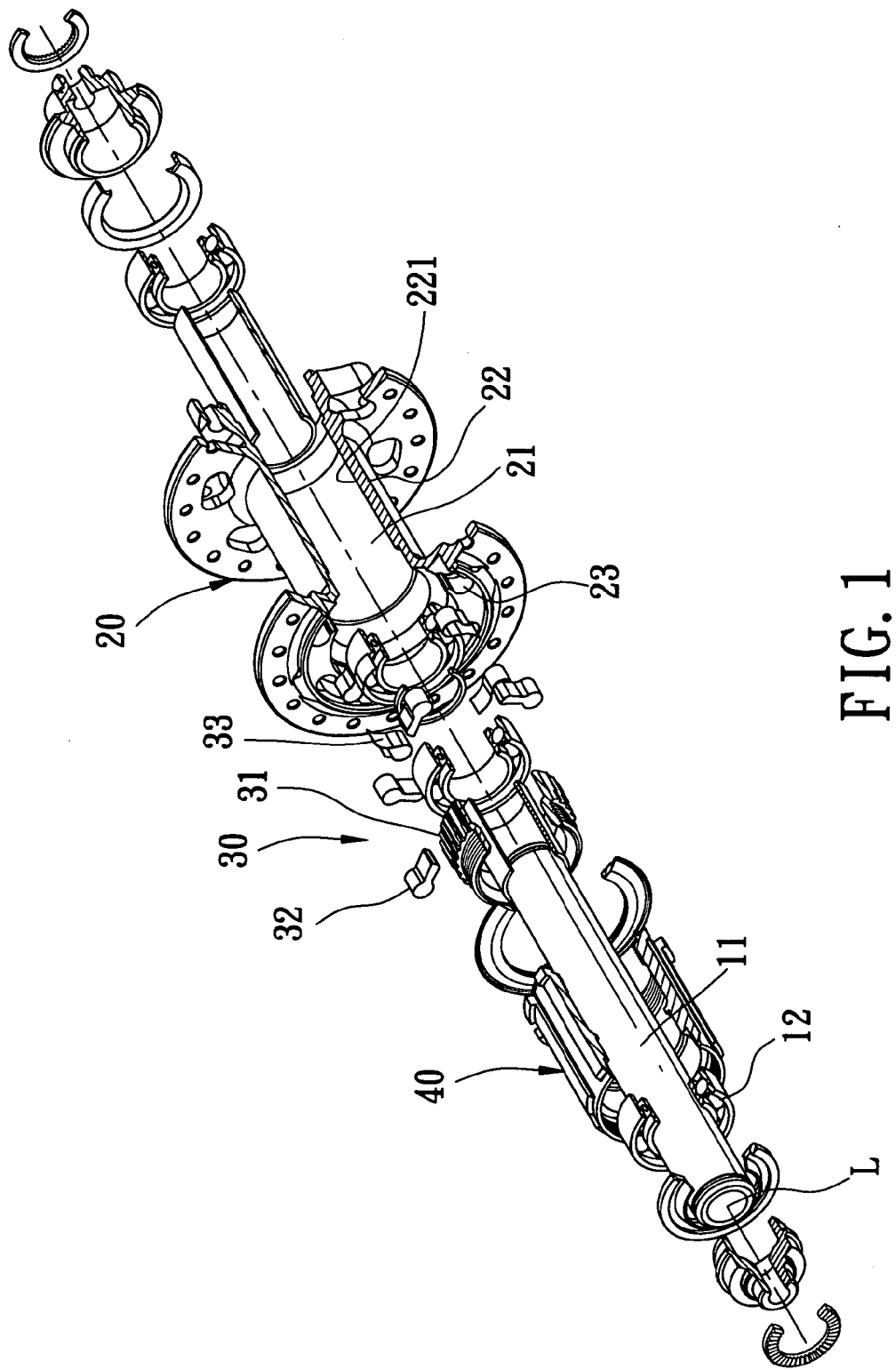
FIG. 1 is a fragmentary exploded perspective view of a preferred embodiment of a hub assembly for a bicycle according to this invention.
Figure 2:
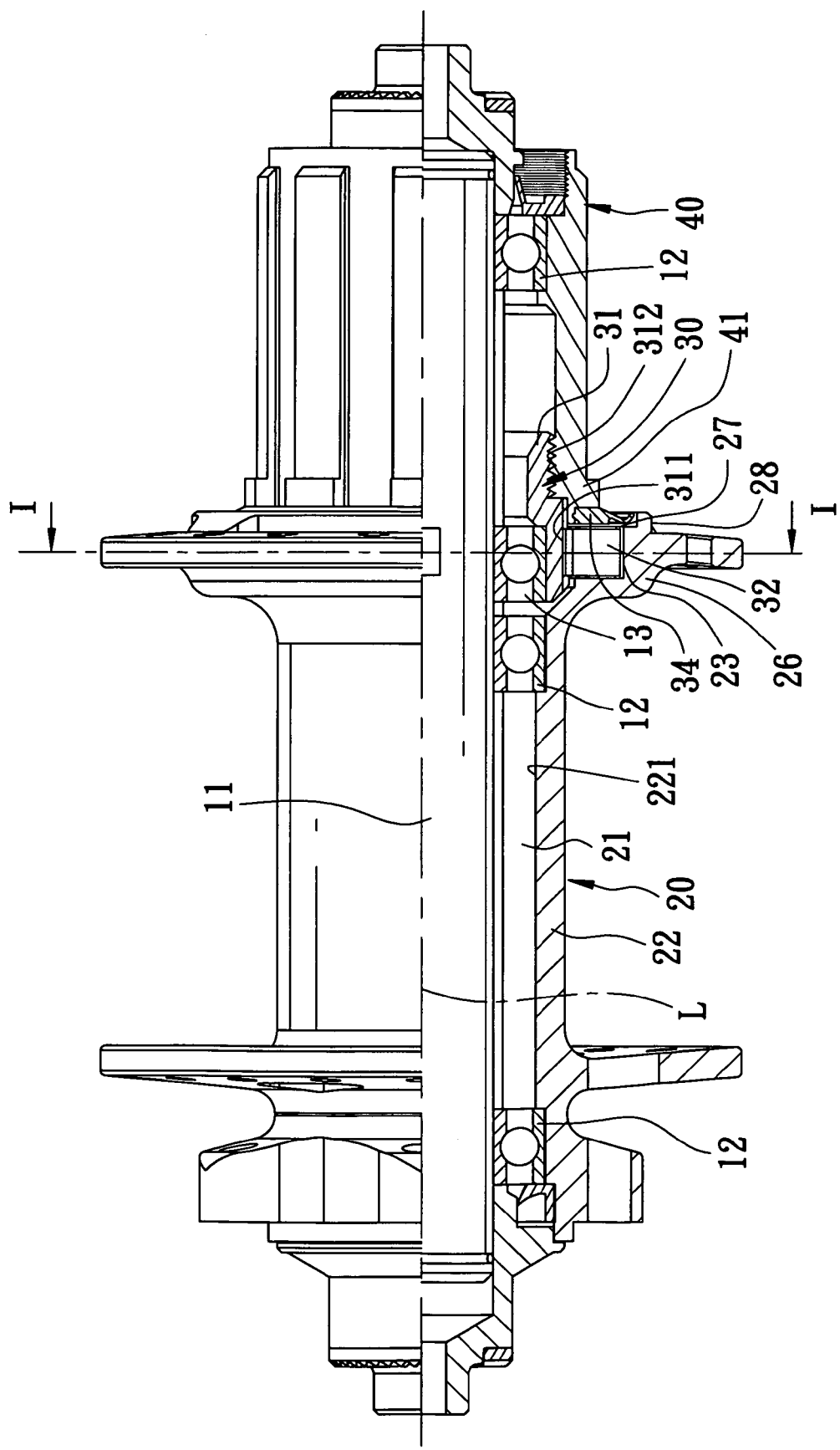
FIG. 2 is a partly sectional view of the preferred embodiment.
Figure 3:
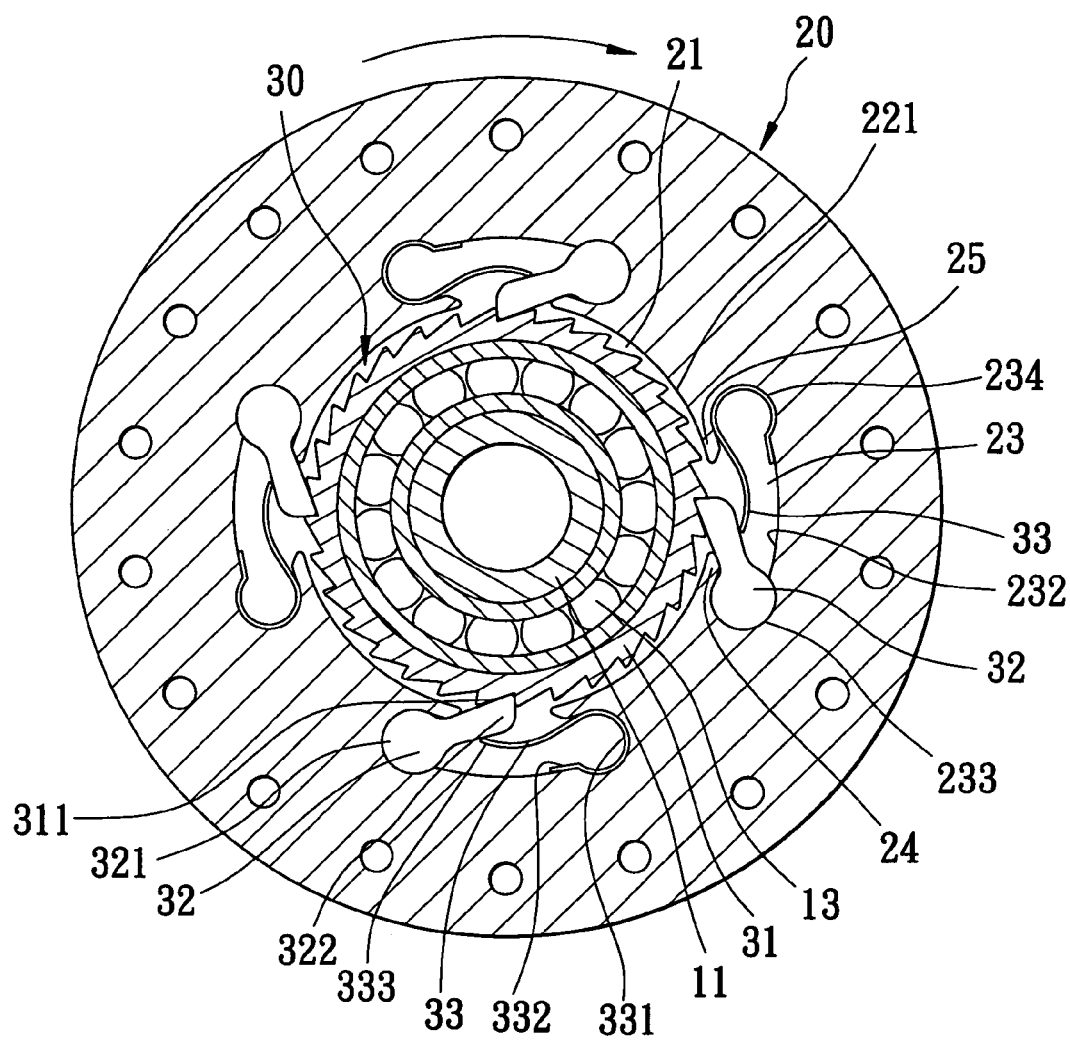
FIG. 3 is a cross-sectional view of the preferred embodiment shown in FIG. 2, taken along lines I—I thereof.

Referring to FIGS. 1 to 3, a preferred embodiment of the hub assembly for a bicycle according to the present invention is shown to comprise a hub shell 20 which is adapted to be mounted on and rotatable relative to a hub axle 11 about an axis (L) by means of bearings 12, and which has a tubular wall 22 with an inner tubular wall surface 221 that is adapted to be spaced apart from the hub axle 11 so as to define an annular accommodation space 21 therebetween. The inner tubular wall surface 221 extends along the axis (L) to terminate at an inner periphery, and has a plurality of retreat bores 23 which are angularly displaced from one another about the axis (L), which are disposed proximate to the inner periphery, and which respectively extend outwardly and radially. A spoke-mounting member 26 includes a tubular mount 28 which extends from the inner periphery outwardly and radially, and which has a plurality of access openings 27 that are angularly displaced from one another around the axis (L) and that extend along the axis (L) to be communicated with the retreat bores 23, respectively. Each of the retreat bores 23 has first and second retaining regions 233, 234 opposite to each other in a clockwise direction, and a middle region 232 interposed therebetween. Each of the first and second regions 233, 234 is substantially hemispherical in shape and has a diameter of at least 5 mm.

A flywheel mounting cylinder 40 is adapted to be rotatably mounted on the hub axle 11 by means of a bearing 12, and which has a tubular coupling wall 41 that confronts the tubular mount 28 and that has an internally threaded portion extending parallel to the axis (L).

A ratchet-and-pawl mechanism 30 includes a plurality of pawls 32, an annular drive member 31, and a plurality of biasing members 33.

Each of the pawls 32 includes a pivotable end 321 which is inserted into the first retaining region 233 of the respective retreat bore 23 from the corresponding access opening 27 and which is pivotable relative to the first retaining region 233, and a coupling end 322 which is opposite to the pivotable end 321 and which extends into the annular accommodation space 21 to be moved by means of pivotal movement of the pivotable end 321 between a driven position, where the coupling end 322 extends radially into the annular accommodation space 21, and an idle position, where the coupling end 322 retreats radially into the corresponding retreat bore 23. A waterproof cover 34 is disposed to cover the access openings 27 to prevent entry of moisture and dust thereinto.

Each of the biasing members 33 is made of a steel strip, and includes a bending portion 331 which is bent and which is retained in the second retaining region 234 of the respective retreat bore 23, and first and second end portions 332, 333 which extend respectively from the bending portion 331 and which are spaced apart from each other in a radial direction relative to the axis (L) so as to vest the second end portion 333 with an urging force for biasing the coupling end 322 of the corresponding pawl 32 to the driven position.

Preferably, the inner tubular wall surface 221 has a plurality of first barrier portions 24 and a plurality of second barrier portions 25 which are disposed adjacent to the first and second retaining regions 233, 234, respectively.

The annular drive member 31 is supported by a bearing 13 to surround the hub axle 11, and includes a coupling segment 312 with an externally threaded portion which threadedly engages the internally threaded portion of the tubular coupling wall 41 so as to couple the annular drive member 31 with the flywheel mounting cylinder 40 to rotate therewith, and a toothed segment 311 which is opposite to the coupling segment 312 along the axis (L) and which extends into the annular accommodation space 21 to confront the pawls 32 radially. The toothed segment 311 is coupled with the coupling ends 322 of the pawls 32 so as to transmit the drive of the flywheel mounting cylinder 40 when the toothed segment 311 engages the coupling ends 322 of the pawls 32 in the driven position to thereby drive the hub shell 20 to rotate in a clockwise direction. The drive is not transmitted when the toothed segment 311 passes over the pawls 32 by forcing the pawls 32 to the idle position, thereby enabling the hub shell 20 to remain unmoved in a counterclockwise direction.

Each of the first barrier portions 24 cooperates with the second end portion 333 of the corresponding biasing member 33 to define a restricting path so as to bring the coupling end 322 of the corresponding pawl 32 into engagement with the toothed segment 311 of the annular drive member 31 in the driven position. Each of the second barrier portions 25 is disposed for preventing removal of the bending portion 331 of the biasing member 33 from the second retaining region 234.

As illustrated, the advantages of the hub assembly according to this invention are as follows:

1. Since the coupling segment 312 and the toothed segment 311 which are formed opposite to each other axially, the annular drive member 31 can be formed with a relatively small thickness while having a sufficient structural strength. Hence, the annular drive member 31 is light and compact. Moreover, since the pawls 32 are received in the retreat bores 23 formed in the hub shell 20, which can be made of aluminum alloy, there is no need to provide a pawl mounting seat as in the aforementioned conventional hub assembly. Thus, the overall weight of the hub assembly of this invention can be reduced.

2. Since each of the pawls 32 is biased by the respective biasing member 33, and is restricted by the respective first barrier portion 24 and the second end 333 of the respective biasing member 33, assembly and alignment of the pawls 32 along the restricting path are convenient to conduct.

3. Even if one of the pawls 32 or one of the biasing members 33 suffers elastic fatigue, the other pawls 32 can still engage the toothed segment 311 of the annular drive member 31 effectively. Moreover, the defective pawl 32 or biasing member 33 is convenient to replace.

4. Since the pawls 32 are mounted radially and outwardly of the toothed segment 311 of the annular drive member 31, the pawls 32, and hence the retreat bores 23, can be increased in size to enhance the structural strength of the hub assembly.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A hub assembly for a bicycle which has a hub axle, comprising:

a hub shell which is adapted to be mounted on and rotatable relative to the hub axle about an axis, and which has an inner tubular wall surface that is adapted to be spaced apart from the hub axle so as to define an annular accommodation space therebetween, that extends along the axis, and that terminates at an inner periphery, said inner tubular wall surface having a plurality of retreat bores which are angularly displaced from one another about the axis, which are disposed proximate to said inner periphery, and which respectively extend outwardly and radially;

a spoke-mounting member including a tubular mount which extends from said inner periphery outwardly and radially, and which has a plurality of access openings that are angularly displaced from one another around the axis and that respectively extend along the axis to be communicated with corresponding ones of said retreat bores, respectively;

a plurality of pawls disposed respectively in said retreat bores, and movable between a driven position, where said pawls extend radially into said annular accommodation space, and an idle position, where said pawls retreat radially into said retreat bores;

a flywheel mounting cylinder which is adapted to be rotatably mounted on the hub axle, and which has a tubular coupling wall that confronts said tubular mount; and an annular drive member including a coupling segment which is coupled to be rotated with said tubular coupling wall, and a toothed segment which is opposite to said coupling segment along the axis and which extends into said annular accommodation space to confront said pawls radially, said toothed segment being coupled with said pawls to form a uni-directional mechanism that enables transmission of drive when said toothed segment engages said pawls in the driven position to thereby drive said hub shell to rotate in a clockwise direction, and that disenables the transmission of drive when said toothed segment passes over said pawls by forcing said pawls to the idle position to thereby enable said hub shell to remain unmoved in a counterclockwise direction.

2. The hub assembly of claim 1, wherein said tubular coupling wall of said flywheel mounting cylinder has an internally threaded portion which extends parallel to the axis, said coupling segment having an externally threaded portion which threadedly engages said internally threaded portion so as to couple said coupling segment to said tubular coupling wall.

3. The hub assembly of claim 1, wherein each of said retreat bores has first and second retaining regions opposite to each other in the clockwise direction, and a middle region interposed therebetween, each of said pawls including a pivotable end which is inserted into said first retaining region from a corresponding one of said access openings and which is pivotable relative to said first retaining region, and a coupling end which is opposite to said pivotable end and which extends into said annular accommodation space to be moved between the driven and idle positions by means of pivotal movement of said pivotable end, said hub assembly further comprising a plurality of biasing members, each of which is received in said second retaining region and which biases said coupling end to the driven position.

4. The hub assembly of claim 3, wherein each of said biasing members is made of a steel strip including a bending portion which is bent and which is retained in said second retaining region, and first and second end portions which extend respectively from said bending portion and which are spaced apart from each other in a radial direction relative to the axis so as to vest said second end portion with an urging force for biasing said coupling end to the driven position.

5. The hub assembly of claim 4, wherein each of said first and second retaining regions is hemispherical in shape and has a diameter of at least 5 mm.

6. The hub assembly of claim 5, wherein said inner tubular wall surface has a plurality of barrier portions, each of which cooperates with said second end portion of a corresponding one of said biasing members to define a restricting path so as to bring said coupling end of a corresponding one of said pawls into engagement with said toothed segment in the driven position.

7. The hub assembly of claim 1, further comprising a ball bearing member interposed between said annular drive member and the hub axle.

8. The hub assembly of claim 1, further comprising a waterproof cover which is disposed to cover said access openings.

* * * * *